United States Patent
Jones

(10) Patent No.: US 7,559,590 B1
(45) Date of Patent: Jul. 14, 2009

(54) PRESSURE TRANSMISSION ASSEMBLY FOR MOUNTING TO A ROBOTIC DEVICE HAVING A ROTATABLE END EFFECTOR

(75) Inventor: Nathan R. Jones, Los Gatos, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 493 days.

(21) Appl. No.: 11/253,388

(22) Filed: Oct. 19, 2005

(51) Int. Cl.
*B25J 15/06* (2006.01)
*B25J 15/08* (2006.01)
*B25J 17/02* (2006.01)

(52) U.S. Cl. .................. 294/2; 294/86.4; 294/65; 901/29; 901/30; 901/40

(58) Field of Classification Search ............... 294/86.4, 294/64.1–64.3, 2, 65; 74/490.05, 490.06; 414/918; 901/29, 30, 31, 40
See application file for complete search history.

(56) References Cited

U.S. PATENT DOCUMENTS

| | | | |
|---|---|---|---|
| 4,378,959 A * | 4/1983 | Susnjara | 414/732 |
| 4,500,065 A * | 2/1985 | Hennekes et al. | 294/86.4 |
| 4,890,573 A * | 1/1990 | Zaber | 118/667 |
| 5,308,132 A * | 5/1994 | Kirby et al. | 294/64.1 |
| 5,777,267 A | 7/1998 | Szydel | |
| 6,230,859 B1 | 5/2001 | Springmann | |
| 6,335,510 B1 | 1/2002 | Carbines | |

* cited by examiner

*Primary Examiner*—Paul T Chin
(74) *Attorney, Agent, or Firm*—Blakely, Sokoloff, Taylor & Zafman, LLP

(57) ABSTRACT

Disclosed is a pressure transmission assembly for mounting to a robotic device having a rotatable end effector. The pressure transmission assembly includes a housing and a flexible pressure transmission member. The housing includes an input port and an output port. The flexible transmission member is coupled between the input port and the output port of the housing. The flexible transmission member is wound within the housing between the input port and the output port and is configured to receive a pressure signal at the input port and to transmit the pressure signal to the end effector through the output port.

20 Claims, 4 Drawing Sheets

PRESSURE TRANSMISSION ASSEMBLY FOR MOUNTING TO A ROBOTIC DEVICE HAVING A ROTATABLE END EFFECTOR

BACKGROUND

1. Field of the Invention

The present invention relates to robotic devices. More particularly, the present invention relates to a pressure transmission assembly for mounting to a robotic device having a rotatable end effector.

2. Description of the Prior Art and Related Information

Robotic devices having jointed-arms may be utilized to perform complex actions by the various sections of the robot arm pivoting and rotating around various joints or axes. Further, a wrist is typically attached to the robot arm. The wrist may often pivot or rotate along two axes.

Attached to the wrist may be one or more end effectors that need to be supplied with energy, pressure, medium, coolant, etc., to perform their various functions. This supply may take place via a plurality of connections, which may be formed as electric cables, hoses, pressure tubes, or the like. The end effectors typically require the supply during all the movements of the end effector for long periods of time.

The movements of the robotic device including the end effectors, may be programmed into a microprocessor and directed in a predetermined or desired path or pattern so that various tasks may be accomplished. A jointed-arm robot can accomplish a variety of different tasks by utilizng different end effectors such as grippers, welders, vacuum heads, or other devices mounted on its wrist. Each end effector has certain power, sensing, communication, and pneumatic, fluid, or gas requirements. For example, an end effector may be designed to lift and move objects by means of a vacuum or a gripper. It should be appreciated that various types of end effectors may require a source of electric power, pneumatic power, and/or hydraulic power in order to drive and move the various components of the end effector.

Accordingly, most modern robots require a means for supplying or transmitting pressure to the end effector, such as hydraulic or pneumatic pressure. With respect to the supply sources, they are generally sourced far away from the end effector and must be routed to the end effector. The general practice in robot design is to design a robot for a specific application with a certain range of motion and then arrange and mount any required supply lines from a supply point down to the end effectors.

Unfortunately, for robots having end effectors mounted to a rotatable wrist that require a pressure supply (e.g. pneumatic or hydraulic), the pressure supply source is generally located a relatively long distance away from the end effector. Typically, the pressure supply connection to the end effector is drawn from a fixed external point in a service tube loop configuration that is arranged to run and loop down to the end effector. These service tube loops ensure that the bundle of tubes may follow all the movements of the end effector.

However, the service tube loops are subjected to a great number of bendings in various directions and with different radii of bending. This constant bending and movement often causes the breaking or pinching of tubes and particle generation. Further, these service tube loops often drag or catch on other tooling. This sort of arrangement often results in the need to repair broken tubes and take the robot off-line. Moreover, this sort of arrangement is unsuitable for a clean-room environment.

There is therefore a need for an effective means to deliver pressure signals down to the rotatable end effectors of a robot in a more compact and less burdensome fashion.

SUMMARY

The present invention relates to a pressure transmission assembly for mounting to a robotic device having a rotatable end effector.

In one embodiment of the present invention, a pressure transmission assembly for mounting to a robotic device having a rotatable end effector is disclosed. The pressure transmission assembly includes a housing and a flexible pressure transmission member. The housing includes an input port and an output port. The flexible transmission member is coupled between the input port and the output port of the housing. The flexible transmission member is wound within the housing between the input port and the output port and is configured to receive a pressure signal at the input port and to transmit the pressure signal to the end effector through the output port.

In another embodiment of the present invention, a robotic device is disclosed. The robotic device includes a rotatable end effector and a pressure transmission assembly. The pressure transmission assembly includes a housing having a plurality of input ports, a manifold, and ribbon tubing. The manifold is rotatably mounted within the housing and includes a plurality of output ports. The end effector is mounted to the manifold. The ribbon tubing includes a plurality of tubes molded together in which each tube of the ribbon tubing is coupled between one of the input ports of the plurality of input ports of the housing and one of the output ports of the plurality of output ports of the manifold. Each tube of ribbon tubing is wound within the housing between a respective one of the input ports and a respective one of the output ports and is configured to receive a pressure signal at the respective one of the input ports and to transmit the pressure signal to an end effector through the respective one of the output ports of the manifold. The manifold rotates with the end effector causing the ribbon tubing to wind or unwind within the housing.

In yet another embodiment of the present invention, a method of providing a pressure signal to a rotatable end effector of a robotic device is disclosed. The method comprises: receiving a pressure signal at an input port of a housing; coupling the pressure signal between the input port of the housing and an output port of the housing through a flexible transmission member; transmitting the pressure signal to the end effector through the output port; and enabling rotation of the output port with the end effector, causing the flexible transmission member to wind or unwind within the housing, respectively.

The foregoing and other features of the invention are described in detail below and are set forth in the appended claims.

DETAILED DESCRIPTION

In the following description, numerous specific details are set forth. However, it is understood that embodiments of the invention may be practiced without these specific details. In other instances, well-known circuits, structures, and techniques have not been shown in order not to obscure the understanding of this description.

Figure 1:
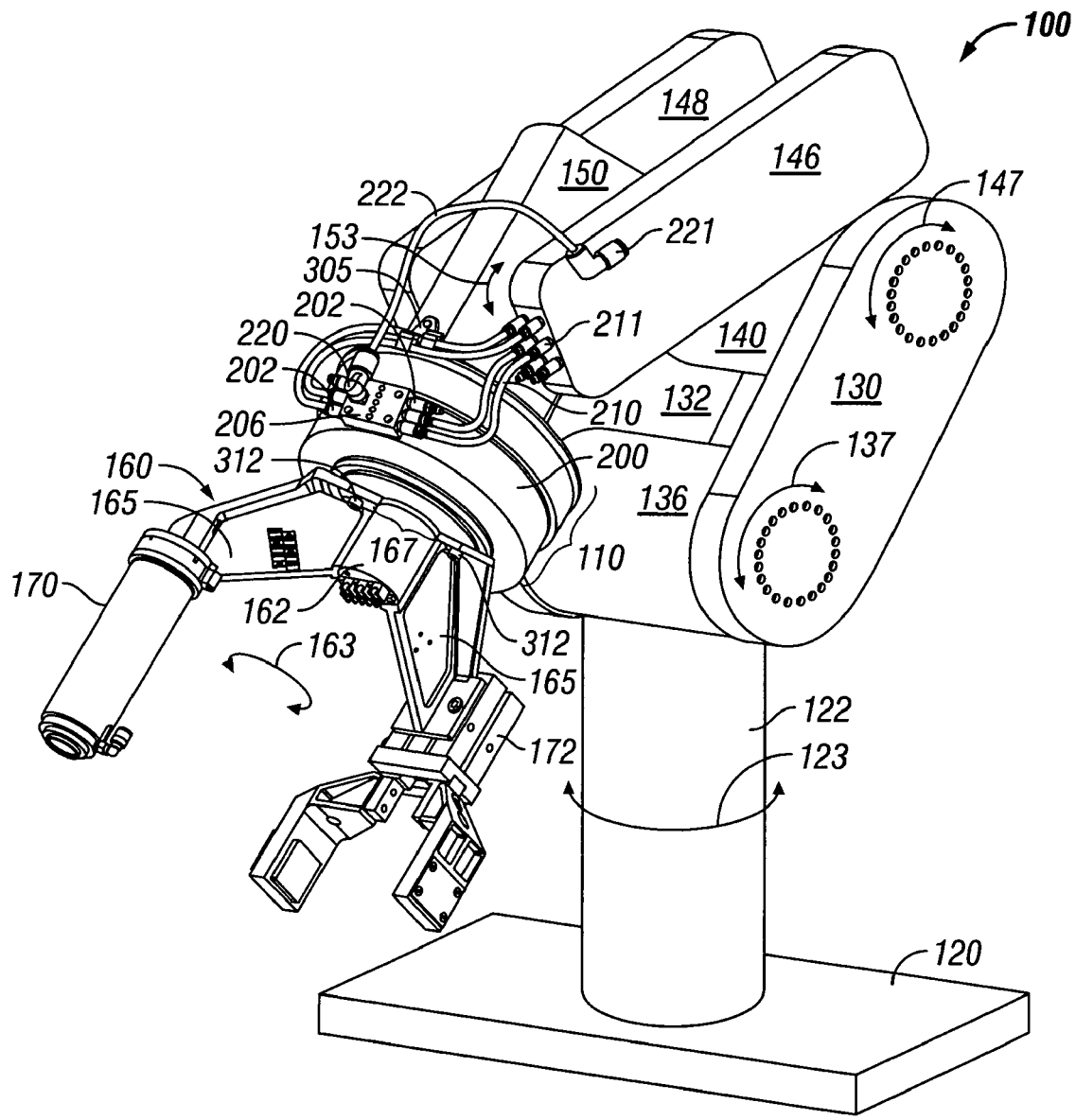
FIG. 1 is a perspective view of a robotic device that may be utilized with embodiments of the invention related to a pressure transmission assembly.

With reference to FIG. 1, FIG. 1 is a perspective view of a robotic device 100 that may be utilized with embodiments of the invention. As will be described in more detail later, a pressure transmission assembly 110 may be mounted to the robotic device 100.

As shown in FIG. 1, robotic device 100 may be mounted to a base 120 by a rotatable shaft 122 that rotates through a range of motion indicated by line 123 about the axis of shaft 122. A pair of opposed first arm portions 130 and 132 may be mounted to rotatable shoulder 136 and rotatable elbow 140. Rotatable shoulder 136 is mounted to rotatable shaft 123. Rotatable shoulder 136 rotates first and second arm portions 130 and 132 through a range of motion indicated by line 137 about the axis of rotatable shoulder 136.

A pair of opposed second arm portions 146 and 148 may be fixedly mounted to rotatable elbow for movement therewith, wherein rotatable elbow 140 provides a range of motion indicated by line 147 about the axis of the rotatable elbow 140 for arms 146 and 148. Arms 146 and 148 may also include opposed rotatable sections to allow arms 146 and 148 to impart another rotatable range of motion (e.g. to allow twisting of arms 146 and 148), depending upon robot design considerations.

A wrist 150 may be rotatably mounted between opposed arms 146 and 148. Wrist 150 rotates through a range of motion indicated by line 153. Further, wrist 150 includes a rotatable shaft (not shown) extending from its bottom-most portion that is typically directly connected to an end effector arrangement 160 to allow a rotatable range of motion indicated by line 163 for the end effector arrangement 160.

As shown in this example, end effector assembly 160 includes cylindrical base 162 and a pair of depending legs 165, to which a vacuum end effector 170 and a gripper end effector 172 are respectively mounted.

According to one embodiment of the invention, a pressure transmission assembly 110 may be mounted to the rotatable shaft of wrist 150, and end effector assembly 160 may be mounted to the pressure transmission assembly 110. For example, a mounting flange 167 of the end effector assembly 160 may be mounted to a rotatable manifold of the pressure transmission assembly 110, as will be described in more detail later, by fasteners 312. It should be appreciated that the term fastener as used hereinafter may refer to bolts, rivets, screws, and other commonly-known mounting components.

It should be appreciated that a wide variety of different types of robotic devices may be utilized having different configurations and providing different ranges of motion, robotic device 100 being but one example. Further, it should be appreciated that various types of end effector assemblies including a variety of different types of end effectors may be utilized, end effector assembly 160 being but one example.

Looking more particularly at pressure transmission assembly 110, as can be seen in FIG. 1, in one embodiment, pressure transmission assembly 110 includes an approximately cylindrically-shaped housing 200 that includes six input ports 202 and six output ports (not shown). Input ports 202 may be mounted on opposed sides of a port mounting block 206.

Input ports 202 of pressure transmission assembly 110 may receive pressure signals from arm 146 of robotic device 100 for transmission to end effectors 170 and 172 through the pressure transmission assembly 110. It should be appreciated that pressure signals may be sourced from other locations as well.

Hereinafter, the term pressure signal will be utilized to refer to one of positive pneumatic or hydraulic pressure or negative pneumatic or hydraulic pressure. Pneumatic pressure may refer to air or other gaseous pressure, whereas, hydraulic pressure may refer to fluid pressure.

Robotic device 100 may supply the pressure transmission assembly 110 with these pressure signals from ports 211 through tubes 210 to the input ports 202 of the pressure transmission assembly 110.

As will be described hereinafter, a flexible pressure transmission member may be coupled between the input ports 202 of the housing 200 and the output ports of the housing. The flexible pressure transmission member may be wound within the housing 200 between the input ports and the output ports and may be configured to receive a pressure signal at one of the input ports 202 and to transmit the pressure signal to one of the end effectors 170 or 172 through one of the output ports.

Additionally, port mounting block 206 may include a vacuum port 220 to receive vacuum pressure from port 221 of the robotic device 100 through vacuum tube 222. In this way, housing 200 of pressure transmission assembly 110 may have vacuum pressure applied within the housing.

Figure 2:
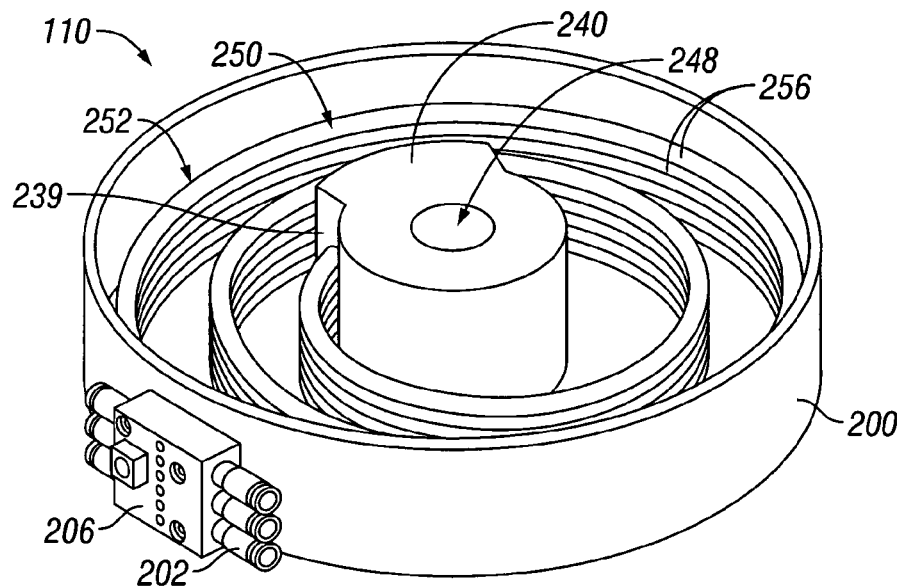
FIG. 2 is a perspective view of a portion of the pressure transmission assembly, according to one embodiment of the present invention.
Figure 3:
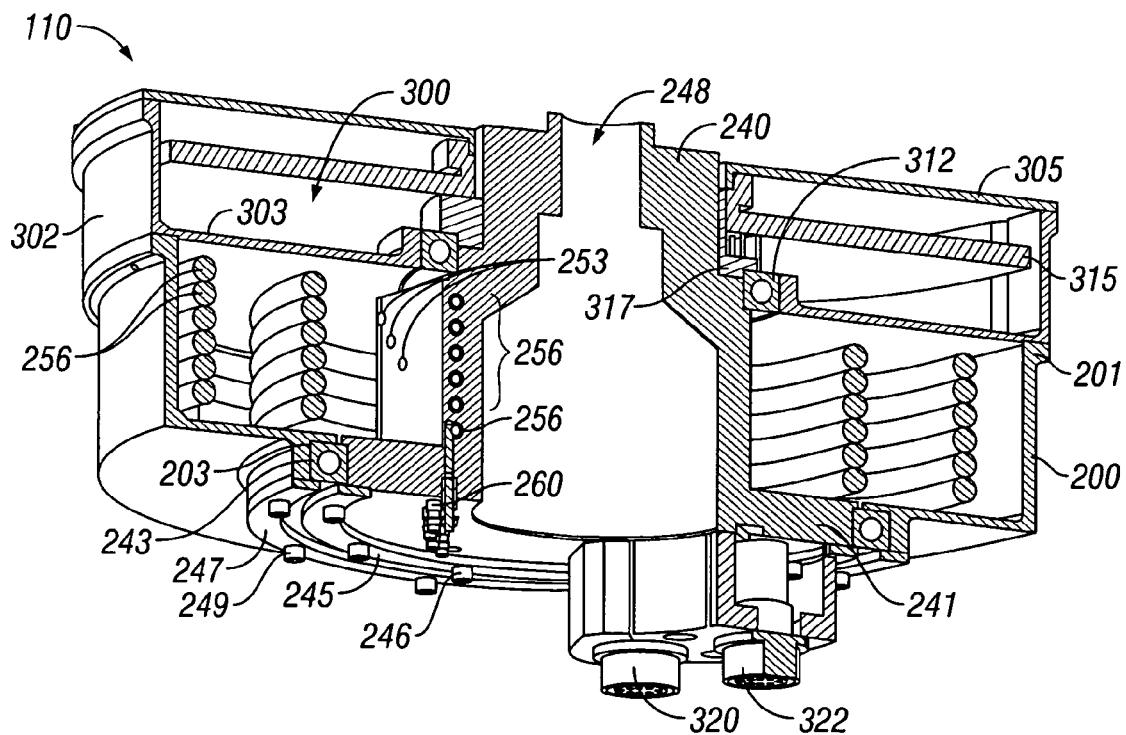
FIG. 3 is a cross-sectional view of the pressure transmission assembly, according to one embodiment of the present invention.

Turning now to FIGS. 2 and 3, the pressure transmission assembly 110 for mounting to a robotic device 100 having a rotatable end effector assembly 160 will be discussed in more detail. FIG. 2 is a perspective view of a portion of the pressure transmission assembly 110, and FIG. 3 is a cross-sectional view of the pressure transmission assembly 110, according to one embodiment of the present invention.

As can be seen in FIGS. 2 and 3, housing 200 is generally cylindrically-shaped with a top flange section 201. A manifold 240 is rotatably mounted within housing 200, as will be described.

Manifold 240 is generally channel-shaped in cross section having a circular base portion 241 that is rotatably mounted within a corresponding flanged opening 203 in the bottom of the housing 200. The base portion 241 of the manifold 240 is rotatably mounted in the housing 200 by a sealed ball bearing assembly 243 fixed in place by circular retainer bracket 247 mounted by fasteners 249 to the flanged opening 203 of housing 200.

The sealed ball bearing assembly 243 is also fixed in place by circular bracket 245, mounted to the base portion 241 of manifold 240 by fasteners 246. Of course, other means for rotatably mounting the manifold 240 may also be employed, such as, e.g., fluid bearing assemblies.

A shaft from the wrist 150 of the robotic device 100 may be fixed into the top circular opening 248 of the manifold 240, such that manifold 240 will rotate with the wrist 150 of robotic device 100.

It should be noted that manifold 240 may be largely empty in its mid-section (as particularly seen in FIG. 3) to reduce the overall weight of the pressure transmission assembly 110. Manifold 240 also may include a slightly thickened portion 239 for the placement of output ports, as will be described below.

A flexible transmission member 250 may be coupled between input ports 202 of housing 200 and output ports 253 of manifold 240, such that as manifold 240 rotates with the end effector assembly 160 of the robotic device 100, the flexible transmission member 250 winds and unwinds within the housing 200.

In one embodiment, the flexible transmission member 250 may include ribbon tubing 252. Ribbon tubing 252 may include a plurality of tubes 256 (e.g. six shown) molded together. For example, ribbon tubing 252 may be made from a polyurethane material. Ribbon tubing 252 may be lubricated with clean-room grease to reduce friction within the housing 200 and to facilitate smooth movement as the ribbon tubing 252 winds and unwinds within the housing as it rotates with manifold 240 and end effector assembly 160.

It should be appreciated that ribbon tubing is only one example of a flexible transmission member. Other examples include various types of flexible pipes, hoses, cables, compression and expansion members, etc.

Figure 4:
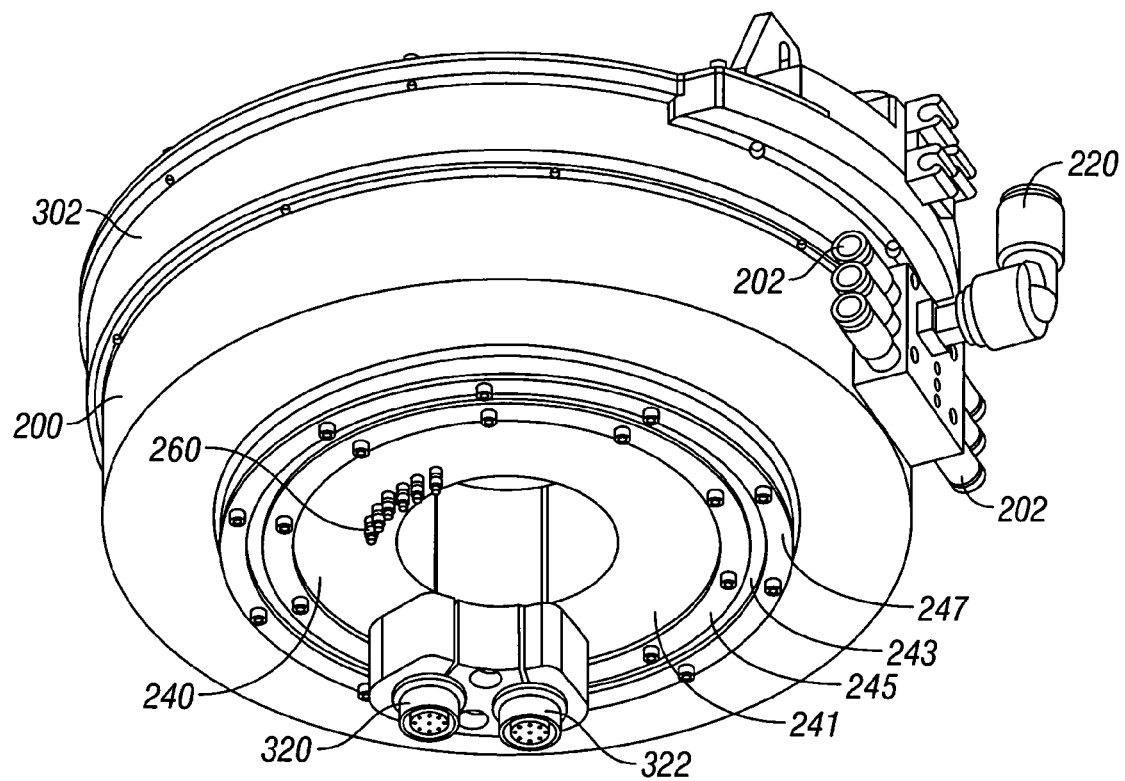
FIG. 4 is a bottom perspective view of the pressure transmission assembly, according to one embodiment of the present invention.

With reference also to FIG. 4, which is a bottom perspective view of the pressure transmission assembly 110, external output ports 260 of the base portion 241 of rotatable manifold 240 can be more clearly seen.

As can be seen in FIGS. 2-4, pressure transmission assembly 110 includes a cylindrically-shaped housing 200 having a manifold 240 rotatably mounted therein. Individual tubes 256 of ribbon tubing 252 are each respectively coupled between an input port 202 of the housing and a respective internal output port 253 of manifold 240. The manifold 240 includes internal air-lines 256 formed therein such that internal output ports 253 of the manifold are in fluid communication with external output ports 260 of the base portion 241 of the manifold 240.

More particularly, each tube 256 of the ribbon tubing 252 is coupled between an input port 202 of the housing 202 and an output port 253 of the manifold 240 in a wound configuration within housing 200. Each tube 256 is configured to receive a pressure signal at an input port 202 and to transmit the pressure signal through the tube 256, through an internal output port 253 of the manifold 240, through an internal air-line 256 of the manifold, and to an external output port 260 of the base portion 241 of the manifold.

From there, the pressure signal may be transmitted to one of the end effectors of the end effector assembly 160 by a tube, as will be described later.

Therefore, as the manifold 240 simultaneously rotates with the shaft of wrist 150 of the robotic device and the end effector assembly 160 within housing 200, which remains stationary, the tubes 256 of the ribbon tubing 252 wind or unwind within the housing 200, respectively.

It should be noted that since the end effector assembly 160 of the robotic device 100 is typically configured to rotate through an arc of less than 400 degrees, the ribbon tubing 252 configuration preferably provides more than sufficient length to accommodate such rotation by the end effector assembly 160, while being completely self-contained within the housing 200.

Further, as can be particularly seen in FIG. 3, the housing 200 may be sealed at its top portion.

In one embodiment, pressure transmission assembly 110 may optionally include an electrical assembly 300 (which will be briefly discussed hereinafter). Electrical assembly 300 may include a cylindrically-shaped housing 302 having a bottom plate 303 that mounts to the top flange 201 of housing 200 and seals housing 200. Cylindrical housing 300 further includes a top plate 305 that in turn seals housing 302.

A sealed ball bearing assembly 312 may be mounted between bottom plate 303 and manifold 240 allowing manifold 240 to rotate within housing 302. Moreover, the sealed bearing assembly 312 seals housing 302 from housing 200, such that the housing 200 may be completely sealed.

Due to the sealing of housing 200, the pressure transmission member may wind and unwind in a housing that is sealed at both the top and the bottom utilizing sealed bearings. Also, because ribbon tubing 252, for example, may be lubricated (e.g., utilizing clean-room grease), excess friction is prevented, and particle generation is minimized. Further, because all the tubing movement takes place inside the housing, contamination can be contained. Additionally, a constant vacuum may be applied (e.g. via vacuum port 220) to housing 200, such that any particles generated can be sucked up by the vacuum. Thus, pressure transmission assembly 110 may be very useful in a clean-room environment.

Moreover, by utilizing ribbon tubing within housing 200 of pressure transmission assembly 110, the flight path of the tubing is carefully controlled, which greatly eliminates broken tubing and contamination caused by tubing leaks.

As previously described, an electrical assembly 300 may be mounted within a cylindrically-shaped housing 302. Housing 302 may be mounted on top of housing 200 of the pressure transmission assembly 110. Electrical assembly 300 may be used to generate electrical signals that can be routed to end effectors of the end effector assembly 160. As can be seen, a commercial slip ring 315, in conjunction with a brush assembly 317, may be utilized to generate electrical signals, as is well known in the art, such that electrical signals may be generated and then transmitted through electrical connectors 320 and 322 down to the end effectors of the end effector assembly 160.

It should be appreciated that the use of electrical assembly 300 mounted in housing 302 with pressure transmission assembly 110 is completely optional. Electrical signals in addition to, or in lieu of electrical assembly 300, may be generated by the robotic device 100 itself in a standard manner. If electrical assembly 300 is not utilized with pressure transmission assembly 110, the top portion of the housing 200 of the pressure transmission assembly may simply be sealed with a suitable top plate (to perform the same function of the bottom plate of housing 302).

Figure 5:
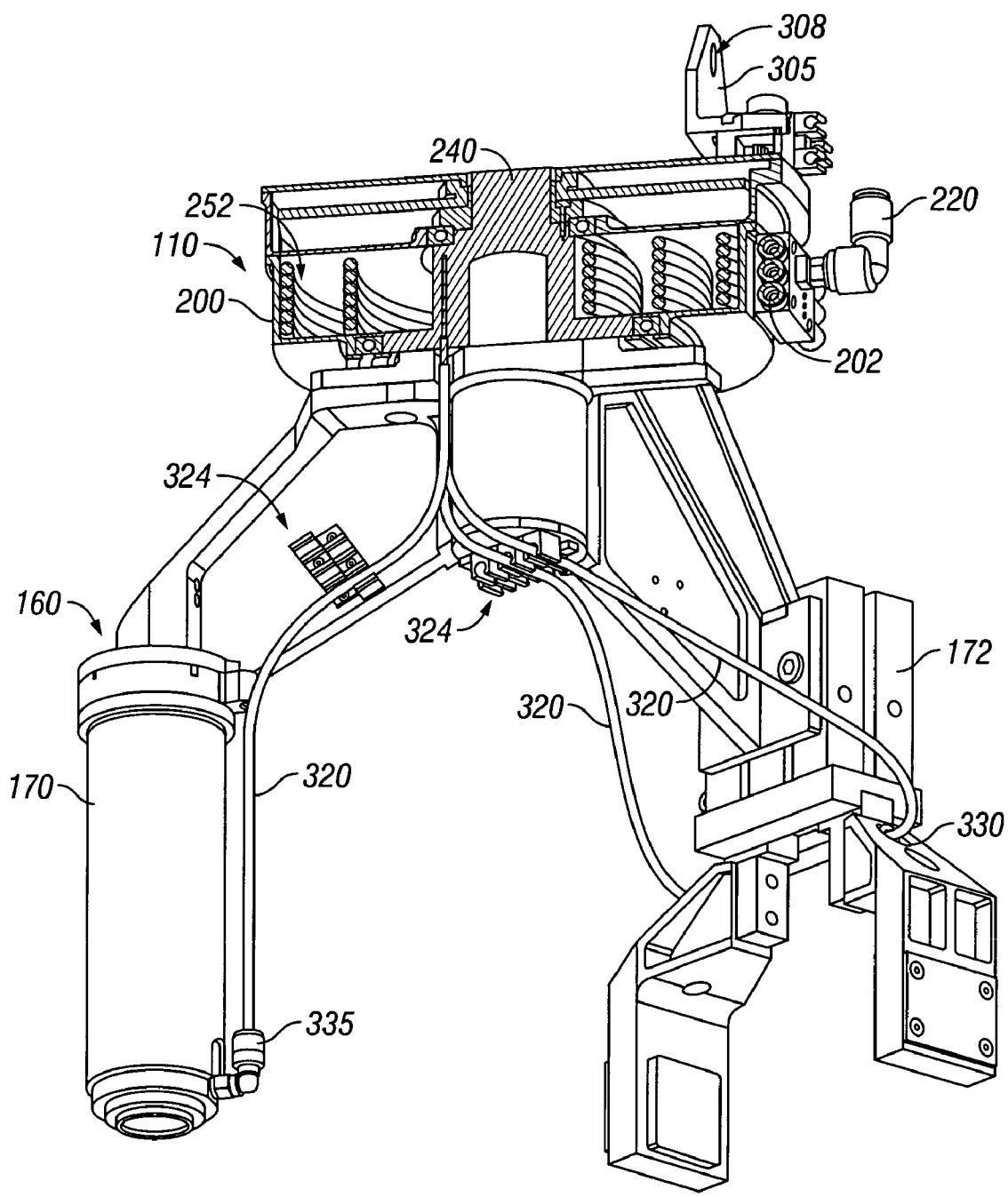
FIG. 5 shows a perspective view of an end effector assembly and a cross-sectional view of a pressure transmission assembly, according to one embodiment of the present invention.

With reference now to FIG. 5, FIG. 5 shows a perspective view of end effector assembly 160 and a cross-sectional view of pressure transmission assembly 110. Further, with reference to FIG. 1 in combination with FIG. 5, an example of how pressure transmission assembly 110 may be mounted to robotic device 100 will now be described.

As can be seen in FIGS. 1 and 5, an approximately triangular-shaped mounting member 305 extends upwards from pressure transmission assembly 110. The mounting member 305 has a mounting hole 308. A suitable fastener mounted through mounting hole 308 of mounting member 305 may be used to mount pressure transmission assembly 110 to wrist 150 of robotic device 110.

By this mounting, housing 200 of the pressure transmission assembly 110 remains fixed with respect to the wrist 150 of the robotic device and travels with the wrist 150 through the range of motion indicated by arrow 153.

However, as previously discussed, manifold 240 is rotatably mounted within housing 200 of pressure transmission assembly 110 and is fixed to the rotatable shaft of the wrist 150 such that manifold 240 travels through a range of motion as indicated by arrow 163 along with end effector assembly 160. As previously discussed, and as can be seen in FIG. 1, the end effector assembly 160 has a mounting flange 167 that may be mounted to the bottom surface of manifold 240 by fasteners 312.

Thus, the rotatable end effector assembly 160 rotates with manifold 240 through a rotational range of motion 163 imparted by the rotatable shaft of wrist 150 of the robotic device to perform commanded robotic functions while housing 200 remains relatively fixed.

By utilizing pressure transmission assembly 110, pressure signals can be transmitted to end effectors (e.g. 170 and 172) of the end effector assembly 160 in a compact and clean fashion while the end effector assembly 160 rotates. Particularly, pressure signals may be transmitted to end effectors 170 or 172 by being routed through input ports 202 of housing 200, through ribbon tubing 252 wound within the housing, through output ports 260 of the base portion of manifold 240, and through tubes 320 connected between output ports 260 and end effectors 170 or 172. The tubes 320 may be fixed to the end effector assembly 160 by being fixed in tube holders of tube holder arrangements 324.

Thus, as the end effectors 170 and 172 of the end effector assembly 160 are commanded to be rotated by robotic device 100 to perform a specific function, and as pressure signals are transmitted to the end effectors to cause the performance of the desired function, manifold 240 rotates with the end effector assembly 160 causing the ribbon tubing 252 to wind or unwind in a compact fashion within the housing 200. As is well known, the movements and functions of the robotic device, including those performed by end effectors 170 and 172, may be programmed into a microprocessor, such that the end effectors' 170 and 172 movements and functions may be directed in a predetermined pattern so that various tasks may be accomplished.

Additionally, as previously discussed, the ribbon tubing 252 may be lubricated to reduce friction within the housing 110 and to reduce particle contamination. Further, a vacuum may be applied to pressure transmission assembly 110 (via vacuum port 220) such that pressure transmission assembly 110 can be used in a clean-room environment. Also, because tubes 320 routed to end effectors 170 and 172 are basically stationary, as they are fixed in tube holders, they likewise should not create bending or breaking problems.

As a particular example, positive or negative pressure signals may be transmitted to gripper 172 through tubes 320 to input ports 330 of gripper 172 to enable the gripping and/or releasing of an object. Thus, gripper 172 may be used to grip an object.

Similarly, pressure signals may be transmitted through a tube 320 down to vacuum port 335 of vacuum 170, such that the vacuum 170 may be used to provide positive or negative air pressure to pick up an object or to clean an object.

It should be appreciated that end effectors 170 and 172 of end effector assembly 160 are only provided as examples of end effectors that require a pressure signal to enable end effector functionality, and that a wide variety of different end effectors may be utilized with pressure transmission assembly 110 of the present invention.

As previously described, according to embodiments of the invention, a pressure transmission assembly 110 having a pressure transmission member contained within a housing 200 that winds and unwinds simultaneously with the rotation of the shaft of wrist 150 of the robotic device and end effector assembly 160 provides a compact way in which to apply pressure signals down to an end effector assembly of a robotic device—thereby obviating the need for large external service tube loops. Because the flight path of the tubing is carefully controlled, broken tubing and contamination caused by member leaks is largely eliminated. Also, because the housing may be sealed and a vacuum applied, the pressure transmission assembly 110 may be particularly suited for robotic devices that operate in a clean-room environment.

It should be appreciated by those with skill in this art that, although embodiments of the invention have been previously described with reference to particular robotic device components, that the embodiments of the invention may be utilized in a wide variety of differing types of robotic devices having different types of rotatable end effector assemblies, and that the details disclosed in describing the embodiments of the invention are not intended to limit the scope of the invention as set forth in the appended claims.

What is claimed is:

1. A pressure transmission assembly for mounting to a robotic device having a rotatable end effector, the pressure transmission assembly comprising:
   a housing including an input port and an output port; and
   a flexible pressure transmission member coupled between the input port and the output port, the flexible pressure transmission member being wound within the housing between the input port and the output port and configured to receive a pressure signal at the input port and to transmit the pressure signal to the end effector through the output port, wherein the housing further comprises a manifold that includes the output port, the manifold being rotatably mounted within the housing and configured to couple to the end effector, wherein the manifold rotates with the end effector of the robotic device causing the flexible pressure transmission member to wind or unwind within the housing.

2. The pressure transmission assembly of claim 1, wherein the housing is sealed and a vacuum is applied to the housing.

3. The pressure transmission assembly of claim 2, wherein the pressure transmission assembly is utilized with the robotic device in a clean-room environment.

4. The pressure transmission assembly of claim 1, wherein the flexible pressure transmission member is lubricated.

5. The pressure transmission assembly of claim 1, wherein the manifold and the end effector of the robotic device are configured to rotate through an arc of less than 400 degrees.

6. The pressure transmission assembly of claim 1, wherein the flexible pressure transmission member comprises a tube.

7. The pressure transmission assembly of claim 6, wherein the tube includes a polyurethane material.

8. The pressure transmission assembly of claim 6, wherein the housing further comprise a plurality of input ports and the manifold further comprises a plurality of output ports and the tube further comprises ribbon tubing including a plurality of tubes molded together, each tube of the ribbon tubing being coupled between one of the input ports of the plurality of input ports of the housing and one of the output ports of the plurality of output ports of the manifold, each tube of the ribbon tubing being wound within the housing between a respective one of the input ports and a respective one of the output ports and configured to receive a pressure signal at the respective one of the input ports and to transmit the pressure signal to an end effector through the respective one of the output ports of the manifold, wherein the manifold rotates with the end effector of the robotic device causing the ribbon tubing to wind or unwind within the housing.

9. The pressure transmission assembly of claim 1, wherein the pressure signal is one of positive pneumatic pressure or negative pneumatic pressure.

10. The pressure transmission assembly of claim 1, wherein the pressure signal is one of positive hydraulic pressure or negative hydraulic pressure.

11. The pressure transmission assembly of claim 1, wherein the end effector is one of a gripper or a vacuum.

12. A robotic device comprising:

a rotatable end effector; and a pressure transmission assembly including:

a housing having a plurality of input ports;

a manifold having a plurality of output ports rotatably mounted within the housing, the end effector mounted to the manifold; and ribbon tubing including a plurality of tubes molded together, each tube of the ribbon tubing being coupled between one of the input ports of the plurality input ports of the housing and one of the output ports of the plurality of output ports of the manifold, each tube of the ribbon tubing being wound within the housing between a respective one of the input ports and a respective one of the output ports and configured to receive a pressure signal at the respective one of the input ports and to transmit the pressure signal to an end effector through the respective one of the output ports of the manifold;

wherein the manifold rotates with the end effector causing the ribbon tubing to wind or unwind within the housing.

13. The robotic device of claim 12, wherein the housing is sealed and a vacuum is applied to the housing.

14. The robotic device of claim 13, wherein the robotic device is utilized in a clean-room environment.

15. The robotic device of claim 12, wherein the ribbon tubing is lubricated.

16. The robotic device of claim 12, wherein the manifold and the end effector of the robotic device are configured to rotate through an arc of less than 400 degrees.

17. The robotic device of claim 12, wherein the ribbon tubing includes a polyurethane material.

18. The robotic device of claim 12, wherein the pressure signal is one of positive pneumatic pressure or negative pneumatic pressure.

19. The robotic device of claim 12, wherein the pressure signal is one of positive hydraulic pressure or negative hydraulic pressure.

20. The robotic device of claim 12, wherein the end effector is one of a gripper or a vacuum.

\* \* \* \* \*